Aug. 6, 1968    J. L. SCHNETTLER    3,395,765
SMALL ROTARY HAMMER
Filed Dec. 19, 1966    3 Sheets-Sheet 1
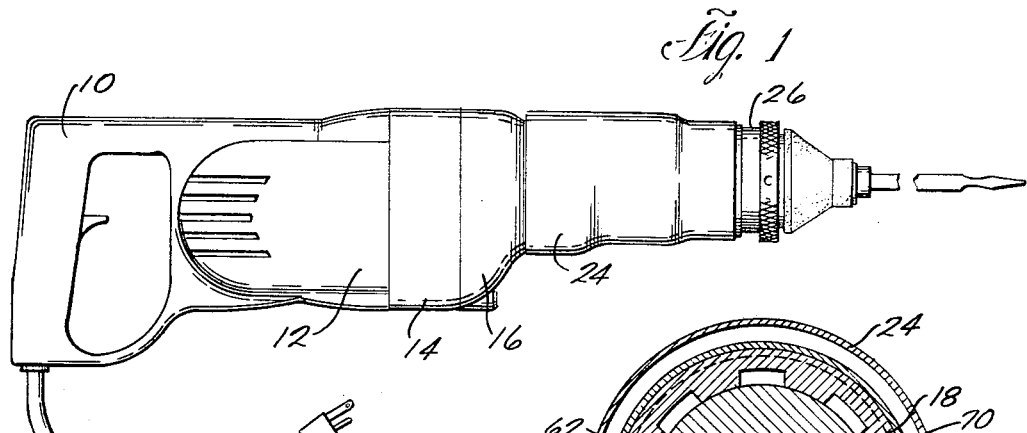
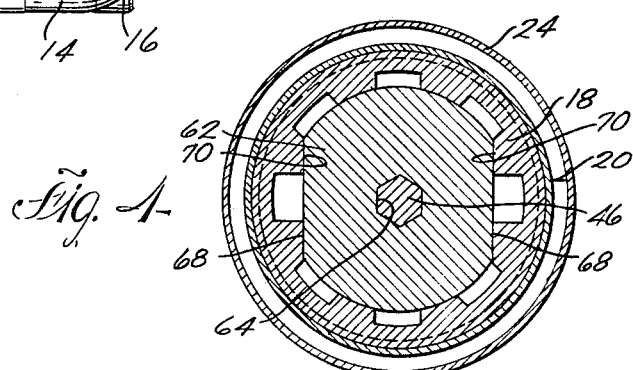
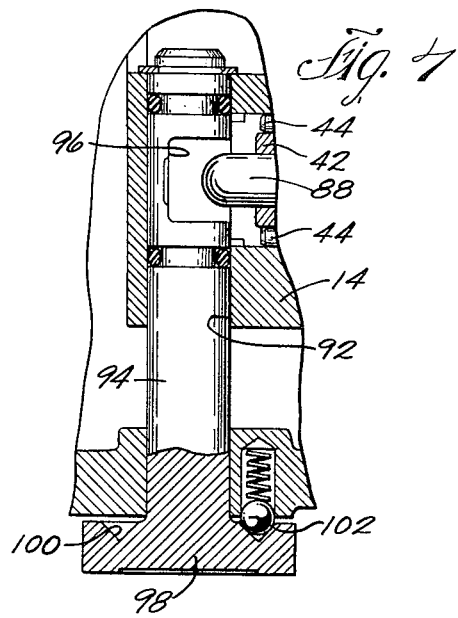
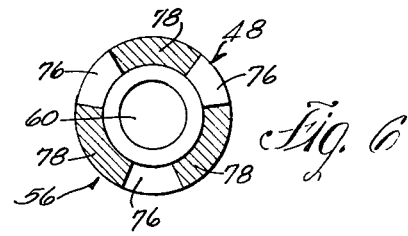
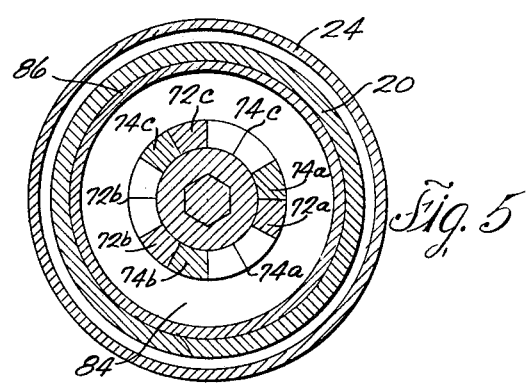
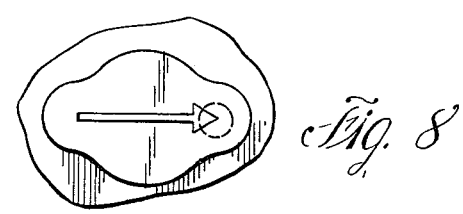
Inventor
Jerome L. Schnettler
By Gerrit D. Foster
Attorney Aug. 6, 1968   J. L. SCHNETTLER   3,395,765
SMALL ROTARY HAMMER Filed Dec. 19, 1966   3 Sheets-Sheet 2

Inventor
Jerome L. Schnettler
By Gerrit W. Foster
Attorney

United States Patent Office 3,395,765
Patented Aug. 6, 1968

3,395,765
SMALL ROTARY HAMMER
Jerome L. Schnettler, Milwaukee, Wis., assignor to Milwaukee Electric Tool Corporation, Brookfield, Wis., a corporation of Wisconsin
Filed Dec. 19, 1966, Ser. No. 602,646
6 Claims. (Cl. 173—13)

This invention relates to a portable electrically driven tool, particularly a hammer drill, which is designed to provide hammering with rotation, hammering only or rotation only.

The object of this invention is to provide such a tool which is relatively compact in size and light in weight, requires a minimum of maintenance with parts readily replaceable, is relatively inexpensive to manufacture, is easily handled and controlled in hammering and non-hammering usage, and may be used in a variety of positions.

This object is obtained by providing a tool of this type which has an electric driving motor, with its drive shaft geared to a rotatably mounted spindle assembly. The connecting gears and spindle assembly are carried in a two part housing consisting of a diaphragm and gear case removably bolted as a unit to the motor housing. The spindle assembly through a connecting hex rod rotates an axially movable and rotatable drive chuck. This chuck mounts a ram operating cam to which it is engaged and disengaged by a jaw clutch. The chuck and cam are carried in a sleeve or housing which is threaded on a ram housing bolted to the gear case. A spring-biased and spring-buffered ram on such ram housing is mounted on and movable axially of, such spindle assembly and drive chuck. Such ram is cocked and released by the rotatable non-axially movable ram operating cam. The rotation of such cam is controlled by such positive jaw clutch which is engaged whenever the drive chuck is forced inwardly by pressure exerted by the operator as a tool in such chuck is urged into the work. When no hammering is required a shift pin is moved by a shift shaft and locked so that the drive chuck cannot be moved inwardly to engage such clutch. The hammering impact takes place between a face on the ram and the end of the drive chuck. There is no direct contact between the ram and the end of the tool. Thus the materials of the ram and the drive chuck can be properly specified to stand up under repeated impacts. In the event of damage to ram or drive chuck either or both may be readily replaced by unthreading the sleeve from the ram housing to expose those parts for removal in the manner hereinafter described. Also the operator controlled shift shaft and pin permit non-hammering drilling action without the necessity of special tool elements or adapters such as is shown in U.S. Patent 3,270,821. While the drive chuck always rotates in the operation of the tool, a non-tapered adapter (not shown) can be used in place of the tapered adapter and a tool with a cylindrical stem can be held for rotation relative to the drive chuck, then only hammering will occur.

The characteristics and applications of this invention may be best understood by the following description of a specific embodiment when read in connection with the accompanying drawings, in which:

FIG. 1 is a view in side elevation of a hammer drill embodying the present invention;

FIG. 4 is a sectional view taken on the line 4—4 of FIG. 2 showing the non-rotational axially slidable mounting of the ram;

FIG. 5 is a sectional view taken on the line 5—5 of FIG. 2 showing the camming teeth on the ram and the cam;

FIG. 6 is a sectional view taken on the line 6—6 of FIG. 2 showing the jaws of the positive clutch between the drive chuck and the cam;

FIG. 7 is a fragmentary enlarged sectional view taken on the line 7—7 of FIG. 2 showing the shift shaft and shaft pin in hammering position;

FIG. 8 is an end view of the handle on the shift shaft shown in FIG. 7;

Figure 2:
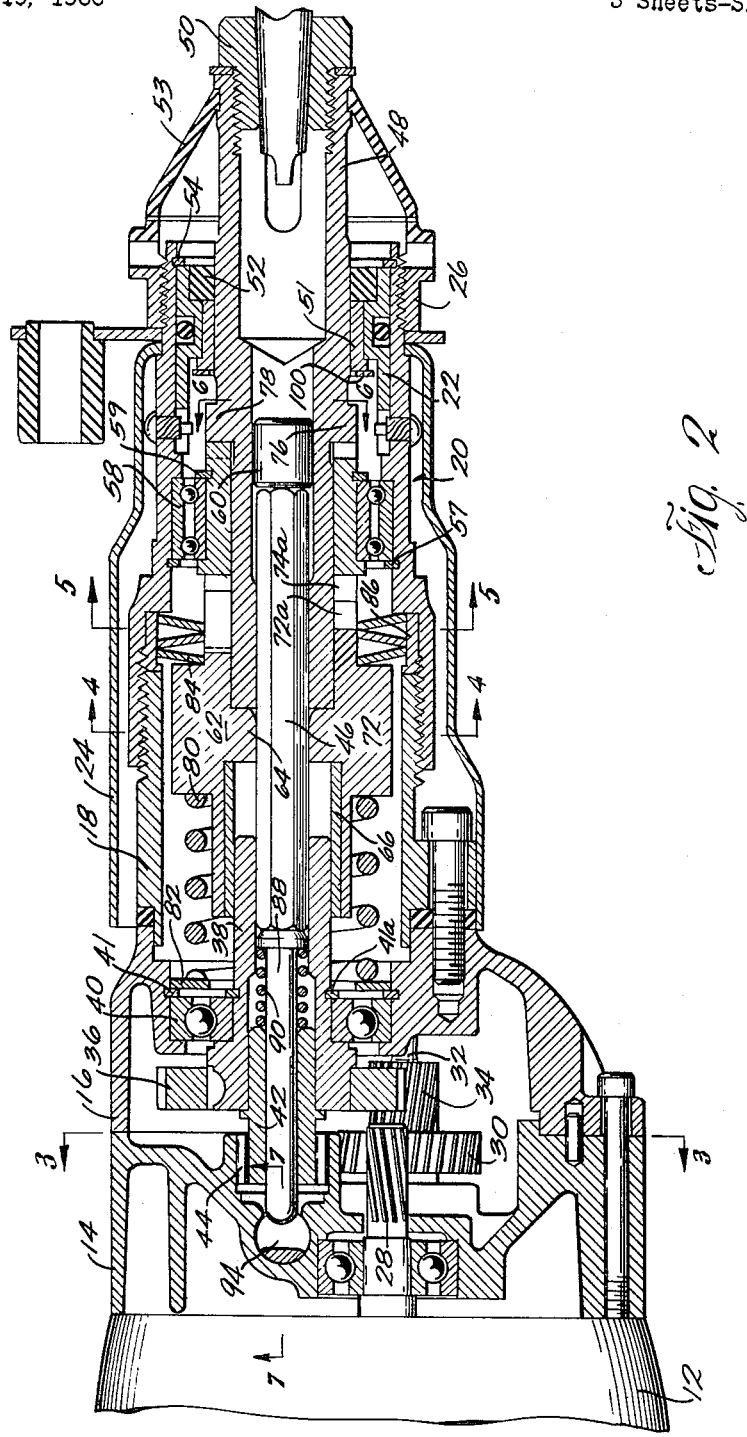
FIG. 2 is a view in longitudinal vertical section taken through the center of the hammer drill shown in FIG. 1.

Referring to the drawings by reference numerals, the portable hammer drill there shown includes a sectioned housing consisting of the following sections: handle 10; motor housing 12; diaphragm 14; gear case 16; ram housing 18; sleeve 20; nose housing 22; shield 24; and sleeve nut 26. The diaphragm and gear case are bolted to the motor housing by fasteners in an orthodox manner. The ram housing is bolted to the gear case. The sleeve, however, is threaded to the ram housing for easy removal.

Power for all operations is supplied by a conventional electric motor (not shown) controlled by the usual trigger type switch carried in the handle and motor housing. The shaft of such motor projects into the diaphragm 14 and has formed thereon a driving gear 28.

Figure 3:
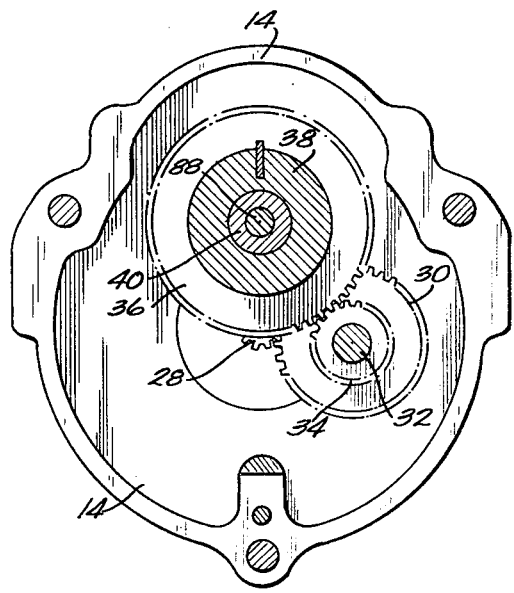
FIG. 3 is a fragmentary sectional view taken on the line 3—3 of FIG. 2 showing the gear train arrangement.
Figure 9:
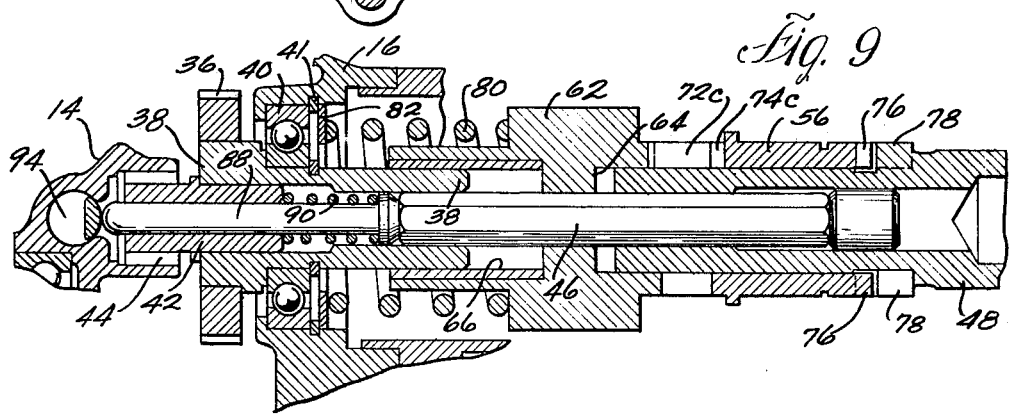
FIG. 9 is a fragmentary longitudinal vertical sectional view of the hammer drill shown in FIG. 2 with the parts in non-hammering position.

Rotative power from such driving gear is supplied to an intermediate gear 30 fixedly carried on an intermediate shaft 32 mounted in bearings (not shown) in the diaphragm 14 and gear case 16. The shaft 32 has a driving pinion 34 (see FIG. 3) by which rotative power from the shaft 32 is transmitted to a spindle gear 36 which is fixedly carried on a spindle 38. As best shown in FIGS. 2 and 9, such spindle is supported within the diaphragm and gear case by (1) a spindle bearing 40 held in the gear case 16 by spring type retainers 41 and 41a, and (2) a spindle insert 42 on such spindle mounted in a bearing 44 in a pad formed on the interior of the diaphragm 14.

The rotative power supplied to the spindle gear 36 is transmitted by the spindle 38 to a hex driver 46 connected with a drive chuck 48. Such chuck is provided with a tool receiving adapter 50. This drive chuck is rotatively and axially movable in a nose bushing 51 carried by the nose housing 22. At the outer end of this bushing is a rubber seal 52 to prevent dirt and dust from entering. An additional protector or rubber shield 53 is fitted as shown on the end of the drive chuck. The bushing and seal are held in place within the end of the nose housing by a retaining ring 54 which also holds the nose housing in place within the sleeve 20. The inner reduced diameter portion of the drive chuck 48 is supported for rotation and axial movement within a bore in a cam 56. This cam in turn is rotatively carried in a cam bearing 58 fixed against axial movement within the sleeve 20 by retaining springs 57 and 59. Both the spindle 38 and the drive chuck 48 have aligned openings of hexagonal cross section into which the hexagonal driver slidably fits to provide rotation while permitting relative axial movement for the reciprocating hammering action hereinafter described. An insert 60 is rigidly secured within the bore of the drive chuck 48 to provide an abutment for the end of the hex driver 46 to hold such chuck in non-hammering position as will be described in detail.

Figure 10:
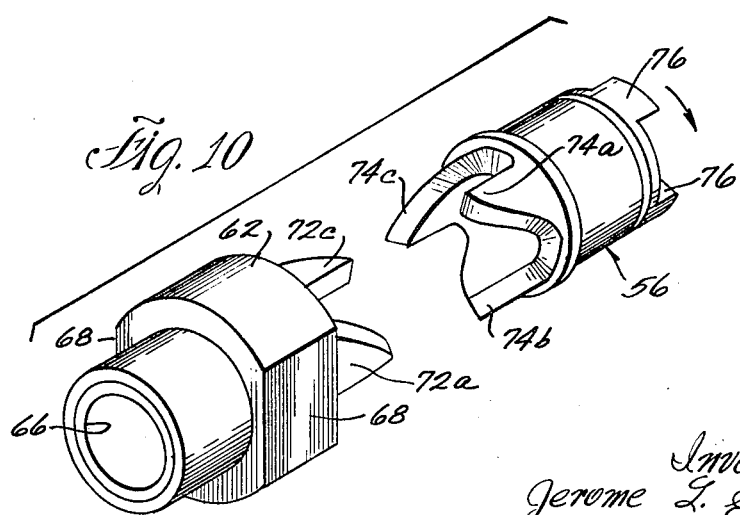
FIG. 10 is an exploded perspective view of the ram and its camming teeth, and the cam with its camming teeth and jaws of the positive clutch.

An important feature of this invention resides in the manner in which the hammer action is imparted to the end of the drive chuck 48 without undue wear or damage to the parts. As shown in FIGS. 2 and 9 the hammering action is supplied by a ram 62 which has an internal striking flange 64 reciprocally movable in alignment with the inner end of the drive chuck 48. This ram has a bushing 66 which slidably rides on the outer surface of the spindle 38 and a forward bore which slides on the inward portion of the drive chuck 48, thus keeping the ram properly aligned. As shown in FIGS. 4 and 10, the ram has oppositely placed flats 68 which are guided between flat areas 70 formed on the inner wall of the ram housing 18. Thus the ram is constrained from rotation while having limited axial reciprocation. The ram has three equally angularly spaced teeth 72a, 72b and 72c which interengage with similarly spaced teeth 74a, 74b and 74c on the cam 56. These teeth are shaped as shown in FIG. 10 and in non-hammering position of the cam (see FIG. 9) the sloping sides of the teeth 74a, 74b and 74c abut against the respective sloping sides of the teeth 72a, 72b and 72c while the drive chuck is being rotated. The forward or right end of the cam is provided with standard jaw clutch teeth 76 which are interchangeable with complemental clutch teeth 78 on the drive chuck 48. When the drive chuck is forced inwardly to the hammering position shown in FIG. 2 these clutch teeth are engaged and the drive chuck rotates the cam 56 in the direction indicated by the arrow at FIG. 10. As the cam is so rotated the cam teeth 74a, 74b and 74c force the cam teeth 72a, 72b and 72c to ride up the surfaces of the former moving the non-rotatable ram 62 inwardly. This compresses and stores energy in a ram spring 80 positioned in the ram housing 18 about the reduced end of the ram and spindle 38 and abutting a shoulder on the ram and a ram spring washer 82 resting on the spindle bearing 40. After about one-third of a revolution of the cam 56 the teeth on the cam will slide off the teeth on the ram and the energy in the ram spring 80 will force the internal flange 64 on the ram to strike against the inner end of the drive chuck 48 causing a hammer-like blow to be imparted to a tool held in such chuck. The application of the force is thus transmitted indirectly to the tool instead of to one end thereof thus eliminating the damaging effect on the end of the tool when the blow is placed directly on such end.

A buffer spring 84 consisting of several spring discs is carried in a buffer spring housing 86. This housing is mounted on the sleeve 20 as shown and is held against an internal shoulder on such sleeve by the end of the ram housing 18. The purpose of buffer spring 84 is to cushion the forward or hammering movement of the ram and assure that direct contact hammer blows are transmitted to the end of the drive chuck and not to other parts of the device. When not activated by the cam 56, the ram 62 is held in a null position by ram spring 80 and the buffer spring 84.

In the hammering position shown in FIG. 2, the drive chuck is in the inner position forced there by the operator urging the device and the tool mounted therein against the work. The clutch 76–78 is engaged and upon rotation of motor the cam 56 will cause the ram to operate as described. However, it is essential at times to use the hammer-drill solely for drilling. To accomplish this a shift pin 88 is slidably mounted in the bore of the spindle 35. It has a head which is resiliently held in contact with the inner end of the hex driver 46 by a spring 90. This spring reacts between such head and the spindle insert 42 in which the shaft pin is also slidably mounted. The inner (left hand) end of the shift pin is rounded as shown and projects from the spindle insert into a lateral bore 92 (see FIG. 7) in the diaphragm 14. Rotatable in this bore is a shift shaft 94 which has a cutout section which when aligned with the end of the shift pin allows the pin to be moved against the spring 90 to the position shown in FIGS. 2 and 7. However, when the shift shaft is rotated 180° the end of the shift pin rides onto the cylindrical side of such pin to force the hex driver 46 outwardly and disengage the clutch 76–78 as shown in FIG. 9. In this position no rotation will be transmitted to the cam 56 and no hammering will take place no matter how hard the hammer drill is pressed toward the work. The shift shaft has a T-like head 98 (see FIG. 8) with a direction marker. The under side of this head has diametrically placed recesses 100 into which a spring pressed ball 102 snaps to hold the shift shaft either in the hammering position (FIGS. 2 and 7) or a non-hammering position (FIG. 9).

The spring 90 has enough force so that when the shift shaft is in the hammering position, such spring will cause the drive chuck 48 to move out and disengage the clutch 76–78 every time the operator withdraws the hammer drill and a tool therein from the workpiece. This is an important feature as it stops hammering action whenever the tool is not in engagement with the work to eliminate a dangerous condition. Since the clutch teeth 78 on the drive chuck extend also to the outward face thereof, such outward faces and edges of such teeth would ride against the nose bushing 51 whenever the operator is withdrawing a tool from the work material. To avoid damage to such bushing a loose fitting hardened thrust washer 100 is placed on the drive chuck between such bushing and the clutch teeth 78.

Another feature of this invention is the sectional structure of the housing which enables a quick change of damaged parts such as the ram 62. To change the ram 62 it is only necessary to unscrew the sleeve 20 (in some circumstances it may be advisable to first remove the shield 24) from the ram housing 18. This will permit direct withdrawal of the following parts from the ram housing 18: ram 62; ram spring 80; hex driver 46; shift pin 88; and shift pin spring 90. The buffer spring housing 86, and buffer spring 84 can be removed from the sleeve 20. By removing C-type retainer 57, the cam 56, and the cam bearing 58 can be withdrawn from the sleeve 20. When necessary to interchange drive chucks, the adapter 50, its washer, and a rubber shield 53 are removed. Then the drive chuck can be slid rearwardly out of the nose housing bushing 51.

The rotary drill thus described may rotate a tool with hammering or without hammering. By using a tool adapter (not shown) and straight round shank tool it may hammer the tool without rotating the tool. Its hammering parts such as the ram and drive chuck may be easily removed for repair or replacement. The operator can positively set the rotary drill against hammering without using a special tool element with a reduced hexagonal portion as shown in U.S. Patent 3,270,821.

Although but one embodiment of the present invention has been illustrated and described, it will be apparent to those skilled in the art that various changes and modifications may be made therein without departing from the spirit of the invention or from the scope of the appended claims.

I claim:
1. A hammer drill comprising:
a driven spindle;
a rotatable drive chuck mounted for limited axial movement, said chuck having first clutch teeth;
means interconnecting said spindle and said chuck;
a cam rotatable with respect to said chuck, means for supporting said cam and preventing axial displacement thereof, said cam having second clutch teeth engageable by said first clutch teeth upon axial movement of said drive chuck, said cam having a first cam surface; and
a ram associated with said spindle and drive chuck, means biasing said ram toward said drive chuck to effect a direct blow to said chuck, means restraining said ram from rotation and permitting axial movement thereof, said ram having a second cam surface engageable by said first cam surface to move said ram against said biasing means upon rotation of said cam by said drive chuck.

2. A hammer drill as defined in claim 1 in which:
the means interconnecting said spindle and chuck is shiftable to a position to prevent said drive chuck from moving axially to engage said clutch teeth; and there is a manually settable shift shaft and shift pin to move said means to and hold said means in said position.

3. A hammer drill as defined in claim 2 in which:
said spindle and chuck have aligned bores of non-round cross section;
said interconnecting means is a non-round cross section member slidable and non-rotatable in said bores;
said shift pin is slidable in said spindle in alignment with said member; and
said shift shaft extends radially of said shift pin and has an eccentrically positioned part to hold said shift pin against said member in a non-clutch engaging position.

4. A hammer drill as defined in claim 1 in which:
there are buffer spring means to receive the shock from said ram as it effects a blow to said chuck.

5. A portable hammer drill as defined in claim 1 in which:
there is a sectionalized housing having a gear case for enclosing gearing for transmitting rotary power to said spindle, a ram housing for enclosing said ram and said ram biasing means, and a sleeve threaded to said ram housing for enclosing said drive chuck and cam;
there is a source of rotary power;
there is gear means carried in said gear case connected with said source of rotary power to transmit rotation to said spindle;
said drive chuck is rotatably carried in said sleeve in axial alignment with said spindle;
said ram is slidably carried by said spindle and drive chuck;
the means restraining said ram from rotation consists of opposing flat surfaces on said ram and said ram housing;
said means interconnecting said spindle and said drive chuck is removable axially therefrom;
said cam is rotatably mounted in said sleeve, and said means for preventing axial displacement acts between said chuck and said sleeve; and
said ram, said biasing means and said interconnecting means being movable from said ram housing when said sleeve is detached therefrom.

6. A hammer drill as claimed in claim 5 in which:
said ram has an internal flange forming an abutment to strike the end of said drive chuck;
spring washers react between said ram and said sleeve to buffer said ram in its impact action; and
biasing means reacts between said ram and said gear case to provide upon compression and release thereof the impact action of said ram.

References Cited
UNITED STATES PATENTS

| | | | |
|---|---|---|---|
| 2,191,608 | 2/1940 | Coates | 173—123 |
| 2,373,667 | 4/1945 | Emery | 173—13 |
| 3,270,821 | 9/1966 | Bassett et al. | 173—123 |

JAMES A. LEPPINK, *Primary Examiner.*